3,087,809
SULFURIC ACID LEACHING OF NIOBIUM ORES
Walter Christopher Spence, Golden, and Paul Verner
Haaber Svendsen, Lakewood, Colo., assignors to Dominion Gulf Company, Pittsburgh, Pa., a corporation of Delaware
No Drawing. Filed Dec. 21, 1959, Ser. No. 860,649
6 Claims. (Cl. 75—115)

This invention relates to the recovery of niobium from ores containing the same.

The object of this invention is to provide a process in which niobium is efficiently recovered from ores containing it with minimum reagent and equipment cost. The element niobium which has considerable commercial value, occurs in a number of ores together with a variety of less valuable elements. For example, the element niobium occurs in ores such as the pyrochlore, koppite and niocalite type usually in the form of complex basic salts such as the oxy-halides. In addition to the niobium, these ores usually contain appreciable quantities of alkaline earth metals such as calcium and magnesium and others. The amount of niobium present in the ore depends upon the quality of the ore. Typical low-grade ores of the pyrochlore type may contain, for example, from 2 to 20 percent calcite (calcium carbonate) and from 0.05 to 1 percent niobium.

The use of acids such as sulfuric acid to decompose this type ore and to solubilize the niobium is accompanied by definite economic and processing disadvantages. In the process of decomposing the ores the sulfuric acid reacts with the calcium or other alkaline earth metals present therein to form large quantities of sulfate salts. The sulfate salts formed, such as calcium sulfate, are highly soluble in the sulfuric acid at elevated temperatures. However, upon cooling the acid solution the sulfate salts precipitate producing a thick cementitious paste or gel which presents considerable difficulty in handling and which also prevents efficient separation and recovery of the sulfuric acid. Because of the large bulk of the material to be treated in the case of low-grade ores, particularly ores containing large quantities of alkaline earth metals, the consumption of costly sulfuric acid is exceedingly great. It is, therefore, of greatest importance for an economically sound process that acid consumption be minimized.

This invention provides a process of extracting niobium from ores containing the same using sulfuric acid wherein the consumption of sulfuric acid is minimized. The process achieves high recovery of niobium from the ores with reduced processing times.

In accordance with this invention, a niobium-containing ore, such as for example, pyrochlore ore, is leached first with a dilute sulfuric acid solution to effect limited decomposition of the ore but not of the niobium mineral, and the resultant leach residue is then subjected to a second leach with more concentrated sulfuric acid under conditions to effect solubilization of the niobium in the acid.

We have found that by first subjecting the ore to a leach with dilute sulfuric acid, certain of the more easily solubilized constituents of the ore are removed by the acid while the niobium remains substantially unaffected by the acid. The niobium, however, is amenable to subsequent extraction with more concentrated sulfuric acid, and surprisingly, the extraction efficiency of the niobium from the ore is significantly improved. Use of a dilute acid leach in conjunction with a subsequent stronger acid leach results in reduced processing times and significant reduction in the total consumption of the sulfuric acid even though the ore contains relatively large amounts of alkaline constituents. Thus, the present process is particularly well adapted, and is therefore directed, to the treatment of ores such as pyrochlore, niocalite, koppite and the like, which contain niobium in the form of complex salts and which contain in addition to the desired niobium metal appreciable quantities of alkaline earth metals such as calcium and magnesium.

The process of this invention will now be discussed in greater detail. Prior to treatment of the ore with sulfuric acid, it is advantageous to first process the ore to remove therefrom acid-decomposable or alkaline constituents such as carbonates, silicates and aluminates which are usually associated with such ores and which would consume large quantities of sulfuric acid. Such prior processing methods for the ore do not form a part of this invention. One preferred method for removal of such acid consuming constituents involves treating the ore with sulfur dioxide and is described in the co-pending application of Bernard J. Lerner, Serial No. 760,496, filed September 11, 1958, now Patent No. 3,025,131.

In the dilute sulfuric acid leaching step it is desired to effect maximum dissolution of the soluble constituents of the ore other than the desired niobium values. Dissolution of the niobium content of the ore during the dilute acid leach is to be avoided. To this end, the niobium-containing ore, preferably after treatment with sulfur dioxide as mentioned heretofore, is leached with a sulfuric acid solution having a concentration of not more than 35 percent sulfuric acid and preferably less than about 25 percent to decompose the ore and dissolve the more soluble constituents of the ore. The amount of sulfuric acid employed in the leach is also controlled so that the ratio of sulfuric acid to ore is less than about 0.2:1 by weight based on anhydrous acid content. When the leaching is conducted with the sulfuric acid of less than about 35 percent concentration at low acid to ore ratios, little or no extraction of the niobium present in the ore occurs and in practically all instances is less than about 5 percent of the niobium content of the ore. However, with sulfuric acid concentrations appreciably above 35 percent and higher acid to ore ratios, the solubilization of the niobium becomes significant and is to be avoided. The leach with the dilute sulfuric acid can be effected at temperatures ranging from ambient up to the boiling point of the sulfuric acid solution employed. The temperature at which the dilute acid leach is conducted is interrelated to some extent with the time factor, that is to say, a leach conducted at ambient temperatures will require a longer leach time than will a leach conducted at higher temperatures to obtain the same results, all other factors being constant. Moreover, when the dilute acid leach is conducted at higher temperatures, greater losses in weight of ore are achieved, which, of course, indicates removal of greater proportion of the acid soluble constituents of the ore. For these reasons, it is preferred to conduct the leach with the dilute sulfuric acid at an elevated temperature, preferably at a temperature near the boiling point of the sulfuric acid leachant. The dilute acid leach can be conducted for periods ranging from one half hour up to as long as 24 hours or more. In practical operation, the dilute sulfuric acid leach generally does not exceed about two hours since the weight loss of the ore is greatest in this period and more extended leach periods are ordinarily not justified by the relatively small incremental weight loss of the ore.

Upon completion of the leach with the dilute sulfuric acid the leach liquor containing the more acid soluble constituents of the ore is separated from the leach slurry by decanting or other processes such as filtering, centrifuging or the like. The leach liquor contains salts essentially in the form of sulfates and bisulfates which are produced from those gangue minerals which are easily solubilized in the dilute sulfuric acid solution. Presumably, the dilute sulfuric acid attacks gangue minerals of the ore such as residual calcite, if present, apatite, pyrite, magnetite, biotite, pyroxenes, amphiboles, feldspars and ilmenite with the result that such metallic elements as calcium, iron, aluminum, magnesium, sodium, potassium, titanium, phosphorus and others are leached from the ore. The leach liquor if economically feasible, can be subjected to further processing for recovery of the dissolved materials or can be simply discarded from the system. Dissolution of the more easily solubilized gangue minerals in the dilute sulfuric acid leach results in several important advantages. By reducing the amount of contaminant minerals present during the subsequent leach operation with the more concentrated sulfuric acid, the loading capacity of the sulfuric acid for niobium is significantly improved. In addition, the possibility of such contaminants interfering with subsequent processing of the sulfuric acid solution to recover the niobium is also greatly reduced.

The solid ore residues resulting from the leach with the sulfuric acid of less than 35 percent concentration contains substantially all of the niobium. This residue is then subjected to leaching with a sulfuric acid solution having a concentration from about 35 to 96 percent sulfuric acid by weight. Sulfuric acid solutions of from 50 to 70 percent concentration are preferred. The amount of sulfuric acid required to accomplish the desired results depends upon a number of factors including the quantity of niobium metal in the particular ore treated which will be solubilized during the leaching process. In all instances the acid must be present in excess of that consumed during leaching and must be adequate to dissolve all of the desired niobium metal. Generally, the acid is employed in an amount to provide an acid to ore ratio of from abut 1:1 to 5:1 or higher by weight based on anhydrous acid content.

Although the leaching operation with the stronger sulfuric acid solution can be effected at ambient temperatures, it is advantageous and preferred to conduct the leach at higher temperatures. Most preferably the leach is conducted at a temperature slightly below the boiling point of the sulfuric acid solution employed in the leaching process. Thus, the leaching operation is effected at temperatures ranging from about 115° C. in the case of 35 percent acid to 320° C. in the case of 96 percent. The leach operation is continued until substantially all of the niobium has been dissolved, this end being accomplished ordinarily in 0.25 to 12 hours.

Upon completion of the leaching operation with the stronger sulfuric acid, the leach liquor containing the dissolved niobium is separated from the ore slurry and is treated to recover the niobium content by any suitable procedure as for example, solvent, extraction, ion exchange, hydrolysis, chromatographic separation methods and the like.

Further details and advantages of the process of the invention will be apparent from the following examples.

EXAMPLE I

A pyrochlore ore having an average particle size of about −100 mesh was treated with sulfur dioxide according to the method disclosed in the aforementioned application Serial No. 760,496, to remove carbonates therefrom. This pyrochlore ore had the following typical analysis:

| | Percent |
|---|---|
| Niobium | 0.346 |
| Calcium carbonate | 9.65 |
| Calcium | 6.83 |
| Iron | 10.75 |
| Aluminum | 3.72 |
| Magnesium | 0.75 |
| Manganese | 0.42 |
| Potassium | 4.60 |
| Sodium | 1.96 |
| Titanium | 0.23 |
| Silicon | 22.0 |
| Sulfur | 0.249 |
| Phosphorus | 0.084 |

This ore is a pyroxenitic ore containing large amounts of acmite and augite type minerals with minor amounts of feldspar, wollastonite, biotite, quartz, apatite, and pyrochlore. After pretreatment with sulfur dioxide the ore was subjected to a leach with a 50 percent sulfuric acid solution. The leaching operation was conducted at a temperature of about 121° C. for a period of about one hour. The 50 percent sulfuric acid solution was employed in an amount to give an acid to calcite-free ore ratio of 1.16:1 based on the weight of anhydrous acid. The percentage of niobium recovered from the ore as a result of this treatment was found to be approximately 51.8 percent.

EXAMPLE II

The same pyrochlore ore was treated with sulfur dioxide as in Example I to remove carbonates therefrom. After treatment with sulfur dioxide the ore was leached with a 13 percent sulfuric acid solution at a temperature of 85° C. for one hour. The acid to ore ratio (based on anhydrous acid content) was approximately 0.15:1. The loss in weight of the treated ore was found to be 5.4 percent. Approximately 0.03 percent of the niobium content was removed by the acid. At the end of the one hour leach period the leach liquor was separated from the leach slurry.

The separated solid ore residue was then subjected to leaching with a 50 percent sulfuric acid. This leaching operation was conducted as in Example I at a temperature of 121° C. for a period of one hour employing an acid to leached ore ratio of 1.23:1. Upon completion of the final leach it was found that approximately 70.3 percent of niobium originally present in the ore was extracted therefrom.

A comparison of the extraction data obtained in the above examples shows that the process of the invention results in marked increase in niobium extraction. As seen from the examples, a greater percentage of niobium was extracted from the ore when the ore was first leached with dilute sulfuric acid.

EXAMPLE III

The effect of varying the conditions of the dilute acid leach operation is shown by the following ore treatment runs. In these runs, variation was made in the acid to ore ratio, the time and temperature at which the dilute acid leach was conducted. The ore employed was the same pyrochlore ore as in the preceding examples and was subjected to the same sulfur dioxide pretreatment. The conditions employed in each run are shown in Table I.

Table I
SUMMARY OF WEAK-ACID LEACH, STRONG-ACID LEACH TEST RESULTS

| Leach test No. | Dilute-acid leach conditions | | | Strong-acid leach conditions | Percent weight loss | | Chemical analysis residue Nb percent | | Nb solubilized in weak-acid leach, lb./ton of feed | Percent extraction, Nb | | Sulfuric acid consumption, lb./ton of feed, total |
|---|---|---|---|---|---|---|---|---|---|---|---|---|
| | Lb.H₂SO₄/ton of feed | Time, hr. | Temp. °C. | | Weak-acid leach | Strong-acid leach | Weak-acid leach | Strong-acid leach | | Weak-acid leach | Strong-acid leach | |
| 1 | 200 | 1 | 90 | In all cases the strong-acid leach was conducted for 15 minutes with 75 percent sulfuric acid at an acid to ore ratio of 1.54 and a leach temperature of 180° C. | 3.2 | 4.7 | 0.43 | 0.05 | 0.0105 | 0.12 | 88.1 | 393.1 |
| 2 | 200 | 8 | 90 | | 3.9 | 4.3 | 0.41 | 0.04 | 0.0168 | 0.20 | 90.7 | 464.5 |
| 3 | 200 | 24 | 90 | | 5.8 | 5.2 | 0.42 | 0.05 | 0.0112 | 0.13 | 88.8 | 391.9 |
| 4 | 150 | 1 | 90 | | 3.4 | 4.2 | 0.41 | 0.05 | 0.0104 | 0.12 | 88.3 | 367.0 |
| 5 | 150 | 8 | 90 | | 3.8 | 5.4 | 0.41 | 0.04 | 0.0096 | 0.11 | 90.7 | 439.7 |
| 6 | 150 | 24 | 90 | | 3.9 | 4.5 | 0.43 | 0.04 | 0.0056 | 0.07 | 91.2 | 390.4 |
| 7 | 100 | 1 | 90 | | 2.9 | 4.1 | 0.42 | 0.04 | 0.0064 | 0.08 | 91.0 | 341.7 |
| 8 | 100 | 8 | 90 | | 2.9 | 5.1 | 0.41 | 0.04 | 0.0048 | 0.06 | 90.7 | 364.5 |
| 9 | 100 | 24 | 90 | | 1.9 | 6.5 | 0.42 | 0.07 | 0.0024 | 0.03 | 84.5 | 391.0 |
| 10 | 200 | 1 | 25 | | 1.1 | 5.0 | 0.40 | 0.05 | 0.0032 | 0.04 | 88.1 | 441.7 |
| 11 | 200 | 8 | 25 | | 2.8 | 5.2 | 0.41 | 0.04 | 0.0056 | 0.07 | 90.7 | 428.4 |
| 12 | 200 | 24 | 25 | | 3.2 | 4.9 | 0.42 | 0.05 | 0.0060 | 0.07 | 88.7 | 465.3 |
| 13 | 150 | 1 | 25 | | 1.4 | 4.6 | 0.41 | 0.05 | 0.0056 | 0.07 | 88.3 | 426.6 |
| 14 | 150 | 8 | 25 | | 2.0 | 5.4 | 0.41 | 0.05 | 0.0064 | 0.08 | 88.5 | 479.5 |
| 15 | 150 | 24 | 25 | | 3.0 | 5.4 | 0.42 | 0.05 | 0.0084 | 0.10 | 88.7 | 414.5 |
| 16 | 100 | 1 | 25 | | 1.2 | 4.7 | 0.41 | 0.05 | 0.0056 | 0.07 | 88.4 | 349.1 |
| 17 | 100 | 8 | 25 | | 1.5 | 5.6 | 0.42 | 0.05 | 0.0088 | 0.10 | 88.8 | 341.7 |
| 18 | 100 | 24 | 25 | | 3.5 | 6.8 | 0.42 | 0.05 | 0.0088 | 0.10 | 88.9 | 431.8 |

As seen from the data in Table I, the amount of niobium solubilized during the dilute acid leach is negligible regardless of the temperature at which the leach was conducted. However, for a given time, the weight loss in the ore is generally greater and the total consumption of sulfuric acid is less when the dilute acid leach is conducted at elevated temperatures.

EXAMPLE IV

The results obtained by leaching an ore in three stages with strong sulfuric acid are compared with results obtained by leaching the ore with dilute sulfuric acid and strong sulfuric acid in accordance with the present invention. The same calcite-free pyrochlore ore as in Example I was employed in these tests.

Leach Test No. 19 was a three-stage cyclic leach of one hour each using 50 percent sulfuric acid as the leachant. The leach was carried out at a temperature of about 121° C. and an acid to ore ratio of 1.6:1 was employed in each stage. A countercurrent system was employed with the pregnant acid from each stage being employed in a preceding stage.

In Leach Test No. 20, the calcite-free ore was leached first with 13 percent sulfuric acid and was then subjected to leaching with 60 percent sulfuric acid for a period of 4 hours. The strong sulfuric acid leach was conducted at 130° C. employing an acid to ore ratio of 1.8:1. The results of both tests are summarized in Table II.

Table II

| | Leach test No. 19 | Leach test No. 20 |
|---|---|---|
| Percent distribution, niobium in tailing residue | 16.06 | 7.0 |
| Percent distribution, niobium in pregnant solution and precipitated salts | 83.94 | 92.30 |
| Over-all average sulfuric acid consumption including acid lost in discarded salts, lb./ton calcite-free residue | 990.0 | 677.0 |
| Over-all average sulfuric acid consumption including acid lost in discarded salts, lb./ton original ore | 863.0 | 590.0 |

The above data shows the significant reduction in acid consumption which is achieved by treating the ore in accordance with the present invention.

In essence, the novel process of the invention involves subjecting niobium-containing ore to a leach treatment with dilute sulfuric acid followed by a second leach treatment with more concentrated sulfuric acid. The advantages of the process derive from the ability of the dilute acid leach treatment to solubilize and remove from the circuit the maximum amount of objectionable salt-forming material with a minimum amount of niobium. Moreover, with the process of the invention the loading capacity of the concentrated sulfuric acid for niobium is improved and the pregnant sulfuric acid solution contains considerably less solubilized contaminants thereby reducing the possibility of these materials interfering with subsequent processing of the sulfuric acid solution to recover niobium therefrom.

The method of the invention is particularly suited for treating ores which contain niobium together with appreciable quantities of alkaline earth compounds, such as for example ores of the type exemplified by pyrochlore, koppite, niocalite, hatchettolite, microlite, betafite, perovskite and the like.

Those modifications and equivalents which fall within the spirit of the invention and the scope of the appended claims are to be considered part of the invention.

We claim:

1. A process for recovery of niobium from an ore containing niobium which comprises: leaching said ore with sulfuric acid of a concentration less than about 35 percent by weight to solubilize the more readily soluble constituents of the ore without appreciable solubilization of the niobium content, separating the liquid and solid products resulting from the said leach treatment, subjecting the solid leach product containing the niobium to a second leach with sulfuric acid of a concentration greater than about 35 percent by weight to solubilize the niobium content thereof.

2. A process for recovery of niobium from an ore containing niobium which comprises: leaching said ore with sulfuric acid of a concentration less than about 25 percent by weight to solubilize the more readily soluble constituents of the ore without appreciable solubilization of the niobium content, separating the liquid and solid products resulting from said leach treatment, subjecting the solid leach product containing the niobium to a second leach with sulfuric acid of a concentration of about 50 to 70 percent by weight to solubilize the niobium content thereof.

3. A process for recovery of niobium from pyrochlore ore which contains in addition to niobium appreciable quantities of alkaline earth materials which comprises: leaching said ore with sulfuric acid of a concentration less than about 25 percent by weight to solubilize the more readily soluble constituents of the ore without appreciable solubilization of the niobium content, separating the liquid and solid products resulting from the said leach treatment, subjecting the solid leach product containing the niobium to a second leach with sulfuric acid of a concentration of about 50 to 70 percent by weight to solubilize the niobium content thereof.

4. A process for recovery of niobium from an ore containing niobium which comprises: leaching said ore for a period of at least about 0.5 hour with sulfuric acid of a concentration less than about 35 percent by weight at an acid to ore ratio of not more than about 0.2:1 by weight based on anhydrous acid content, the said leach being conducted at a temperature ranging from ambient to about the boiling point of the sulfuric acid leachant, separating the liquid and solid products resulting from the said leach treatment, subjecting the solid leach products containing the niobium to a second leach with sulfuric acid of a concentration greater than about 35 percent by weight for a period of at least about 0.25 hour at a temperature ranging from ambient to about the boiling point of the sulfuric acid leachant.

5. A process for recovery of niobium from pyrochlore ore which contains in addition to niobium appreciable quantities of alkaline earth materials which comprises: leaching said ore for a period ranging from about 0.5 to about 24 hours with sulfuric acid of a concentration less than about 35 percent by weight at an acid to ore ratio of not more than about 0.2:1 by weight based on anhydrous acid content, the said leach being conducted at a temperature near the boiling point of the sulfuric acid solution, separating the liquid and solid products resulting from the said leach treatment, subjecting the solid leach products containing the niobium to a second leach with sulfuric acid of a concentration greater than about 35 percent by weight for a period ranging from about 0.25 to 12 hours at a temperature near the boiling point of the sulfuric acid leachant.

6. A process for recovery of niobium from pyrochlore ore which contains in addition to niobium, appreciable quantities of alkaline earth materials which comprises: leaching said ore with sulfuric acid of a concentration less than about 25 percent by weight to solubilize the more readily soluble constituents of the ore without appreciable solubilization of the niobium content, separating the liquid and solid products resulting from said leach treatment, subjecting the solid leach product containing the niobium to a second leach with sulfuric acid of a concentration from about 50 to 70 percent by weight to solubilize the niobium content thereof.

References Cited in the file of this patent

UNITED STATES PATENTS

| | | |
|---|---|---|
| 1,467,516 | Tainton | Sept. 11, 1923 |
| 2,537,316 | Oppegaard et al. | Jan. 9, 1951 |
| 2,773,737 | Nielsen et al. | Dec. 11, 1956 |